United States Patent Office 3,008,800
Patented Nov. 14, 1961

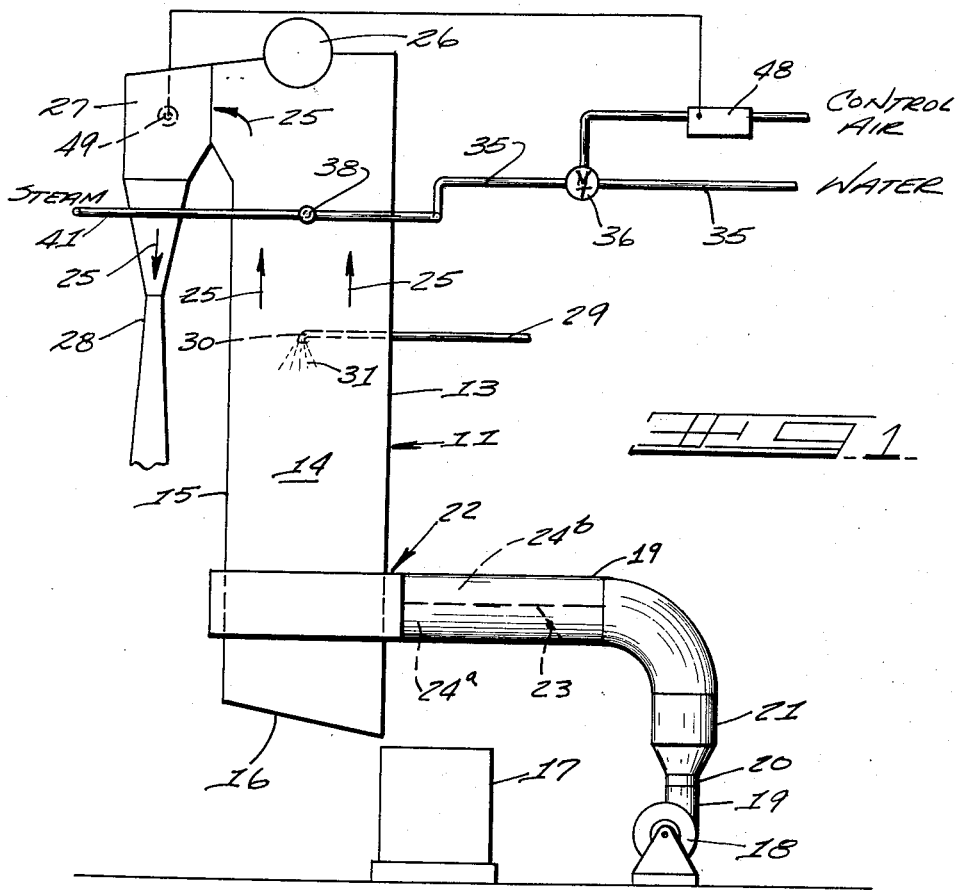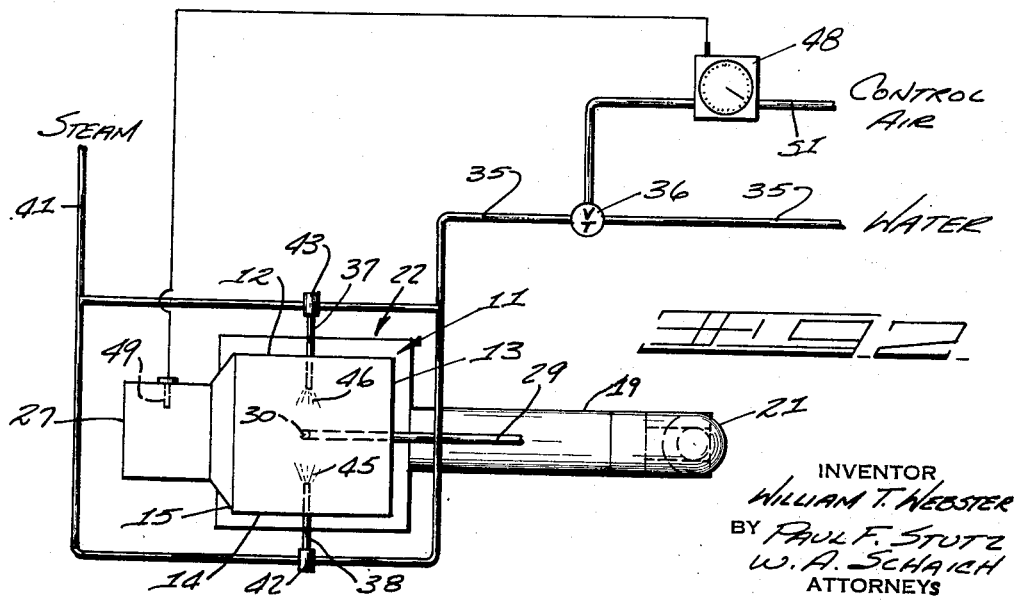

3,008,800
METHOD OF OPERATING FURNACE
William T. Webster, Jacksonville, Fla., assignor to Owens-Illinois Glass Company, a corporation of Ohio
Filed Apr. 17, 1958, Ser. No. 729,204
4 Claims. (Cl. 23—48)

The present invention relates generally to furnaces and a method of operating same. More specifically, the invention relates to a furnace of the type which is used to recover inorganic chemical values which are used in the manufacture of pulp.

In the various types of chemical and semi-chemical pulping processes, chemicals such as sodium hydroxide, sodium sulfite, sodium carbonate, sodium sulfide, and others are used to form a digesting liquor. This digesting liquor is combined with wood chips and chemical action is depended upon to remove encrustations, lignins, and other complex long-chain organic constituents of the wood. The various types of chemical and semi-chemical processes are well-known and need not be discussed in detail. In general, however, the chemicals are employed in conjunction with steam to provide the most advantageous conditions for the action of the chemicals. After the digestion, the liquor containing pulp is subjected to further mechanical action to defiber the pulp, followed by a washing step, whereupon the defibered pulp is separated from the exhausted liquor. The pulp is then processed further, and finally converted to sheet on a proper machine.

Economy of operation makes it extremely desirable to recover the chemicals contained in the exhausted liquor, and such recovery is widely practiced in one form or another.

One such scheme for recovering chemicals involves, generally, the concentration of the exhausted liquor in multiple effect evaporators to such degree that the concentrate measures in the neighborhood of 35% to 60% solids. It is these solids which contain the recoverable inorganic chemicals. In addition, the solids contain a combustible component consisting of complex ligneous materials. It has been found that this concentrate which includes recoverable chemicals and combustibles may be burned in a recovery furnace. Normally, it is customary to utilize an auxiliary fuel such as oil or gas or wood to initiate combustion, and perhaps use even a certain amount of the auxiliary fuel to maintain combustion. Usually, the recovery furnaces are in the form of vertical chambers to which the concentrated liquor is fed at the upper or intermediate portion through a pipe terminating in a spray nozzle which may be stationary or oscillating. The finely divided spray falls downwardly within the furnace and is ignited and burned, the combustibles passing upwardly in the way of exhaust gases to pass out an outlet at the upper end of the furnace. The chemicals, due to the temperature involved, are converted to a smelt which collects as a liquid at the bottom of the furnace and flows out a spout into a dissolving tank containing water. The dissolved smelt is then subjected to further processing, e.g., clarifying, causticizing, addition of make-up chemicals, etc. There is thus finally formed again a digesting liquor which is capable of being reintroduced into the cycle for the purpose of attacking the wood chips as described hereinbefore.

For reasons of economy, the upper portion of the recovery furnace usually has associated therewith a boiler so that the heat produced by the combustion of the combustibles may be used to form steam and thus supply at least a part of the steam requirements of the pulp mill. Conventionally, air is supplied adjacent the bottom of the recovery furnace by a motor driven fan, and the amount of air is used to provide the desirable balance at the bottom of the furnace of oxidizing conditions and reducing conditions, and also to insure an upward flow of exhaust gases. The exhaust gases thus pass upwardly and about the boiler pipes and thence through the outlet of the furnace. The exhaust gases may also be passed down through a venturi scrubber where exhausted liquor is added and concentrated, and thence to a cyclone separator to insure removal of the particles. In the operation of a recovery furnace as described, it has been found that the upper portion of the furnace may become too hot, with the result that fly ash produced by the combustion of the concentrate, which fly ash is carried upward with the exhaust gases, is deposited on the sides of the furnace, the boiler components, and the sides of the outlet. This outlet is generally much smaller in cross-sectional area than that of the main portion of the furnace itself, and, as a consequence, the deposit of the fly ash, in the form of what is commonly referred to as slag, is quite detrimental. Thus, the deposit becomes so large that it completely blocks the outlet of the furnace and necessitates a shutdown of the furnace so that it may be cleaned out by physically scraping the deposit from the surface. In addition, of course, this deposit on the boiler components reduces the heat transfer, and thus reduces the efficiency of the boiler in producing steam. It has been proposed that air may be introduced at the upper portion of the furnace in an attempt to control the temperature of the exhaust gases. Unfortunately, this has not worked to complete satisfaction because it imposes an additional load on the draft fan and, more important, when operated at capacity, fails to effectively cool the exhaust gases to the desired temperature. As a result, deposition of the fly ash continues, and the outlet becomes plugged. In addition, it can be noted that the use of air at the upper portion as described upsets the desired control of the oxidizing and reducing zones at the lower portions of the recovery furnace.

Accordingly, it is an object of the present invention to provide a scheme which overcomes the foregoing deficiencies.

It is a principal object of the present invention to provide a method of operation for furnaces which eliminates the formation of slag deposits at the upper portions of the furnace.

It is also an object of this invention to provide such a furnace which is more efficient in that the yield of steam per quantity of ignited concentrate is greater.

It is another object of the present invention to provide such a method which provides more accurate control of the temperature therein.

It is yet another object of this invention to provide a method which permits a reduction in the power requirements of the induced draft fan.

It is a further object of the invention to provide a method of operation of such furnaces which allows an increase in the furnace production capacity.

It is still another object to provide a method of operation which is capable of simplified control and, at the same time, is less costly than arrangements known heretofore.

The above and other objects of the invention will become apparent to those skilled in the art from the following detailed description, taken in conjunction with the attached sheet of drawings, on which there is presented for purposes of illustration only, a single embodiment of the invention.

In the drawings:

FIG. 1 is a schematic side elevation view of a recovery furnace including certain auxiliary components, said furnace being modified in accordance with the invention.

FIG. 2 is a schematic plan view of the furnace construction shown in FIG. 1.

Basically, the present invention comprises an improvement in the operation of furnaces as described, wherein a fine spray of water is projected within the furnace at the upper portion thereof.

Referring now more specifically to the drawings, there is shown in FIGS. 1 and 2 in schematic form, a recovery furnace 11 and auxiliary equipment which will be discussed later in more detail. The furnace may be supported by suitable superstructure which is not shown, as such forms no part of the invention and is of conventional design. The furnace as disclosed is square in section and has vertical side walls 12, 13, 14, and 15. A bottom wall 16 in the furnace is inclined downwardly in the direction of the wall 13 so that the smelt composed of molten recovered chemicals may pass therefrom into a dissolving tank 17. The dissolved smelt can then be treated and processed in a conventional fashion. Air is supplied to the base of the furnace by a motor driven fan 18 which propels the air through duct work 19, a damper 20, and air heater 21 to a manifold duct 22 which encircles the base of the furnace, the base of the furnace having ports at this point to permit the air to travel to the interior of the furnace. The duct work 19 may preferably be modified as indicated at 23 to provide two draft entrances into the furnace, one of which is damper-controlled so as to provide primary air at a lower zone 24a, and secondary air at a zone 24b spaced just above. Control of the damper will provide oxidizing and reducing zones at the lower portion of the furnace where the air is introduced. The gases of combustion travel upwardly through the furnace as indicated by the arrows 25, and contact the boiler drum 26, then pass transversely out of the furnace proper into a chamber 27, thence downwardly through a venturi scrubber 28.

The concentrated liquor is passed into the furnace by means of a pipe 29 which terminates at a nozzle 30 adapted to spray the finely divided concentrated liquor downwardly as indicated at 31. In accordance with this invention, water is introduced into the upper portion of the furnace above the liquor-introducing pipe by means of the water supply pipe 35. The water passes through a throttling valve 36 to a pair of opposed delivery pipes 37 and 38 (FIG. 2) which extend transversely through the walls 12 and 14. A steam supply pipe 41 connects with the water supply pipes at eductors 42 and 43. A steam pressure of 85 lbs. gauge has been found to be very satisfactory in delivering an even supply of the water through the pipes 37 and 38. The eductor also effects a certain amount of atomization of the water so that it is very finely divided, and, in fact, preferably a spray as it issues from nozzles 45 and 46, respectively, at the terminae of pipes 38 and 37. The amount of water delivered is controlled by the throttling valve 36 which, in turn, is governed by variable control air 51 as determined by the temperature controller 48, which, in turn, is controlled or governed by the thermocouple 49 which projects into the interior of the chamber 27 adjacent the upper portion of the recovery furnace. The temperature controller 48 may be set to increase or decrease the amount of water according to the temperature which it is desired to maintain at the upper portion of the furnace.

A recovery furnace of the type illustrated in the drawings has been operated in accordance with this invention. The operation was employed using commercial quantities and, in fact, feeding about 19,000 lbs. per hour of liquor containing about 55% solids. This amount of liquor was fed through the liquor supply pipe 29. Oil, of course, was first introduced at the base of the furnace, and this oil used to initiate combustion. When the combustion and the draft air had been brought to balance, the supply of oil was terminated, inasmuch as the combustion was self-sustaining due to the combustible component of the liquor. Water was then introduced by means of the arrangement described hereinabove at a rate of about six to eight gallons per minute. It was found that the temperature of the upper portion of the furnace could be successfully maintained at a range of about 900° F. to 950° F. Operation was maintained for a period of about nine months, during which time no shut-down due to cleaning was necessary. Furthermore, even after this time, no appreciable or detrimental build-up of slag was suspected.

In accordance with prior practice, air had been introduced to the upper portion of the furnace but with little success, inasmuch as the temperature of the exhaust gases could not be reduced below about 1100° F. The operation of the furnace using air to cool the upper portions was also unsuccessful, inasmuch as the furnace had to be completely shut down every two to three weeks in order to clean out the upper portions of the furnace. In particular, it had been found that the venturi section was subject to extreme fouling and clogging.

It is believed that the avoidance of fly ash deposit is due to the fact that the lowering of the exhaust gas temperature reduces the temperature of the fly ash particles below the fusion point thereof, and thus eliminates the tendency of the particles to fuse together and build up in the manner described. It may be mentioned that the arrangement and method of the present invention, in addition to the advantages noted previously, also increases the yield of recovered chemicals, inasmuch as the fly ash contains a certain amount of chemicals which, in the former practice, were lost in the excessive build-up of slag. Operation of the furnace in accordance with this invention has been found to permit an increase in the amount of concentrated liquor which may be processed therethrough. Continued operation over a period of time has demonstrated that this increase amounts to about 30%. Thus, prior to this invention, the concentrate feed rate could not exceed about 14,000 lbs. per hour.

It is obvious from the foregoing description that the control of the temperature in the upper portion of the furnace is separate and completely independent from the air draft combustion temperature controlling arrangement for the lower portion of the furnace. Accordingly, the full power requirements of the draft fan may be confined to providing combustion air. This also increases the gas flow upwardly through the furnace and permits, at the same time, a higher solids concentration liquor to be introduced and burned without any increase in carry over.

The maintaining and controlling of the temperature within the indicated ranges is accomplished much more satisfactorily and, at the same time, is easier according to the present invention. One reason this is true is that the water absorbs more heat in the nature of heat of evaporation. In addition, the fine spray or fog, in which form the water is introduced, serves to effectively provide a most advantageous utilization of this heat-absorbing effect. Accordingly, the spray or fog introduction of the water is an important feature of this invention. As indicated, this can be achieved in a very satisfactory manner by the steam eduction system shown and described. However, the spray or fog may be provided by means of a high pressure pump and a suitable nozzle. For purposes of convenience and simplicity of control, it has been found, however, that the steam eduction in combination with the thermocouple, temperature regulator, and throttling valve arrangement is extremely advantageous. Thus, if the operation of other portions of the pulp mill would necessitate either a slow-down or speed-up of the concentrated liquor to the recovery furnace, the automatic control system will immediately regulate the amount of water to correspond to the desired temperature range set on the temperature control. While the use of the water in accordance with this invention absorbs heat which otherwise would be directed to the venturi scrubber, and thus, in effect, reduces the amount of evaporation which might be achieved in the venturi scrubber, the advantages with respect to the recovery furnace as described herein far outweigh this small disadvantage. Thus, the increase, in production capacity of 30% more than outweighs the small increase in solids of the liquor which might otherwise be achieved in the venturi scrubber.

While there have been disclosed certain preferred manners of performing this invention, it is not desired or intended to be limited thereto, for variations may be employed, if desired, without departing from the spirit and scope of the invention as defined in the appended claims.

I claim:

1. In the operation of an incinerating furnace for the recovery of heat and chemicals from pulp residual liquor produced by chemical papermaking processes, said furnace having an upright main body portion with a combustion zone in the lower part thereof and heat transfer surfaces in the upper part thereof, said furnace being provided in the upper part thereof with an outlet of smaller cross-section than said main body portion, said heat-transfer surfaces and said upper outlet portion being subject to fouling by combustion products entrained in exhaust gases produced within said furnace, the improvement which comprises the steps of introducing and burning pulp residual liquor in said combustion zone, thereafter continuously introducing a finely-atomized spray consisting essentially of water droplets into an upper region of said furnace intermediate of its combustion chamber and said outlet portion but above where the pulp residual liquor enters such furnace such that the water sprays into said combustion zone and over the incoming liquor concomitant with combustion of said residual liquor, and controlling the temperature of the said exhaust gases by regulating the amount of said spray introduced thereinto, the temperature of said exhaust gases being controlled to achieve maximum efficiency of said heat-transfer surfaces and to prevent fouling during continuous operation of said furnace.

2. The method in accordance with claim 1, including the step of lowering the temperature of said exhaust gases prior to their contacting said heat-transfer surfaces and conduction into said upper outlet portion of said furnace to substantially below the fusion point temperatures of essentially solid fusible particles of combustion products emanating from said residual liquor and entrained in said exhaust gases.

3. The method in accordance with claim 1, including the steps of forming the finely-atomized aqueous spray with pressurized steam and maintaining the said exhaust gases at a temperature ranging from about 900° to 950° F. within the upper outlet portion of said furnace.

4. In incinerating apparatus for the recovery of heat and chemicals from pulp residual liquor produced by chemical papermaking processes comprising, an upwardly elongated furnace having vertical sidewalls, a combustion chamber disposed within said sidewalls, an exhaust gas outlet at an upper portion and a molten chemical collecting bottom in the lower portion thereof, heat-transfer means disposed within the upper portion of said furnace adjacent said exhaust gas outlet adapted to steam generation, burner means positioned in the combustion chamber of said furnace adapted to introduce and effect combustion of said residual liquor therewithin, means for introducing combustion air into said furnace adjacent said burner means, the combination with at least one atomizing nozzle projecting into said furnace intermediate of said burner means and said heat-transfer means for introducing a finely-atomized continuous spray consisting essentially of water droplets and a temperature responsive means in said outlet for controlling the amount of water introduced so as to regulate the temperature of the exhaust gases produced by said burner means.

References Cited in the file of this patent

UNITED STATES PATENTS

| | | |
|---|---|---|
| 1,809,427 | Spohn | June 9, 1931 |
| 2,023,031 | Rohrer | Dec. 3, 1935 |
| 2,062,091 | Gooch | Nov. 24, 1936 |
| 2,463,757 | Ely et al. | Mar. 8, 1949 |
| 2,590,905 | Tomlinson et al. | Apr. 1, 1952 |
| 2,636,813 | Singleton | Apr. 28, 1953 |
| 2,702,235 | Hochmuth | Feb. 15, 1955 |